(12) United States Patent
Heise et al.

(10) Patent No.: US 10,362,281 B2
(45) Date of Patent: Jul. 23, 2019

(54) PROJECTION APPARATUS FOR PROJECTING AT LEAST ONE FRAME ONTO A PROJECTION SURFACE AND METHOD THEREFOR

(71) Applicant: OSRAM GmbH, Munich (DE)

(72) Inventors: Michael Heise, Berlin (DE); Marc Czichy, Berlin (DE); Bastian Dobler, Unterhaching (DE)

(73) Assignee: OSRAM GMBH, Munich (DE)

( * ) Notice: Subject to any disclaimer, the term of this patent is extended or adjusted under 35 U.S.C. 154(b) by 232 days.

(21) Appl. No.: 15/289,219

(22) Filed: Oct. 10, 2016

(65) Prior Publication Data

US 2017/0104966 A1 Apr. 13, 2017

(30) Foreign Application Priority Data

Oct. 13, 2015 (DE) .................. 10 2015 219 760

(51) Int. Cl.
*H04N 9/31* (2006.01)
(52) U.S. Cl.
CPC ......... *H04N 9/3155* (2013.01); *H04N 9/3114* (2013.01); *H04N 9/3182* (2013.01)
(58) Field of Classification Search
CPC ............ G03B 21/2026; G03B 21/2046; G03B 21/2053; H04N 9/3111; H04N 9/3155;
(Continued)

(56) References Cited

U.S. PATENT DOCUMENTS

2008/0137041 A1 6/2008 Okamoto et al.
2009/0146580 A1* 6/2009 Van Casteren .... H05B 41/2882
315/291

(Continued)

FOREIGN PATENT DOCUMENTS

| CN | 101198204 A | 6/2008 |
| CN | 103034028 A | 4/2013 |
| CN | 103458568 A | 12/2013 |
| DE | 102011089592 A1 | 6/2013 |
| EP | 1309228 A2 | 5/2003 |
| JP | 4883292 B2 | 2/2012 |
| WO | 2008053428 A1 | 5/2008 |

(Continued)

OTHER PUBLICATIONS

German Search Report based on application No. 10 2015 219 760.3 (6 pages) dated May 18, 2016 (for reference purpose only).

(Continued)

*Primary Examiner* — Cara E Rakowski
*Assistant Examiner* — Christopher A Lamb, II
(74) *Attorney, Agent, or Firm* — Viering Jentschura & Partner MBB

(57) ABSTRACT

A projection apparatus includes a discharge lamp; a control apparatus for controlling a discharge current through the lamp. The apparatus is designed in a first drive mode, to control the discharge current having an amplitude profile; in a second drive mode, to control the discharge current in accordance with the amplitude profile; and to change between the first mode and the second mode. The time difference between two changes is given by a first time interval, and the time difference between the change from the first mode to the second mode and a next instance of leaving the second mode is given by a second time interval. The apparatus further includes a control device to determine a first manipulated variable depending on a control deviation determined by the difference between a target voltage value and a measured voltage value, and to determine the first and/or the second time interval therefrom.

14 Claims, 7 Drawing Sheets

(58) Field of Classification Search
CPC .. H04N 9/3114; H04N 9/3182; G02B 26/008; H05B 41/2928; H05B 41/36; H05B 41/16
See application file for complete search history.

(56) References Cited

U.S. PATENT DOCUMENTS

| | | |
|---|---|---|
| 2010/0171434 A1 | 7/2010 | Breuer et al. |
| 2011/0317133 A1 | 12/2011 | Brueckel et al. |
| 2012/0162611 A1* | 6/2012 | Terashima ......... G03B 21/2053 353/30 |
| 2013/0038231 A1* | 2/2013 | Zhang .................. H05B 41/288 315/224 |
| 2013/0088687 A1 | 4/2013 | Terashima et al. |
| 2013/0334962 A1 | 12/2013 | Nishikawa |
| 2014/0340656 A1 | 11/2014 | Mueller et al. |

FOREIGN PATENT DOCUMENTS

| | | |
|---|---|---|
| WO | 2008151669 A1 | 12/2008 |
| WO | 2009007914 A1 | 1/2009 |
| WO | 2009107019 A2 | 9/2009 |
| WO | 2010086222 A1 | 8/2010 |

OTHER PUBLICATIONS

Chinese Office Action issued for corresponding application No. 201610894312.0, dated May 13, 2019, 5 pages (for informational purpose only).

* cited by examiner

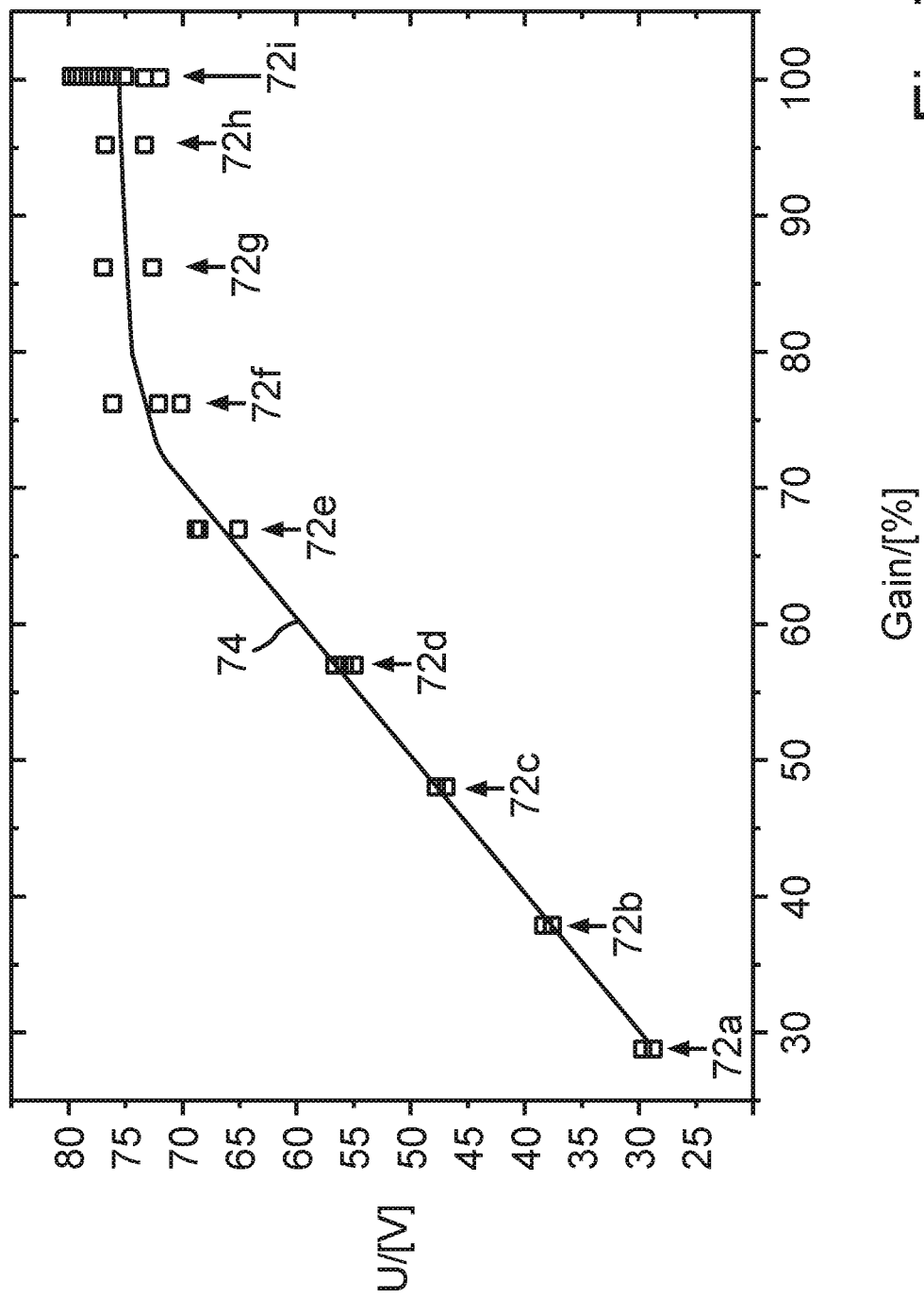

PROJECTION APPARATUS FOR PROJECTING AT LEAST ONE FRAME ONTO A PROJECTION SURFACE AND METHOD THEREFOR

CROSS-REFERENCE TO RELATED APPLICATION

This application claims priority to German Patent Application Serial No. 10 2015 219 760.3, which was filed Oct. 13, 2015, and is incorporated herein by reference in its entirety.

TECHNICAL FIELD

Various embodiments relate generally to a projection apparatus for projecting at least one frame onto a projection surface. Furthermore, various embodiments relate to a method for projecting at least one frame onto a projection surface.

BACKGROUND

Discharge lamps for operation from AC current which are usually used for projection apparatuses, for example a high-pressure mercury lamp sold by the applicant under the type designation P-VIP for use in video projectors, projection television sets and other projection applications, usually have to be subjected to burn-in at the end of the production process. For this purpose, small tips are grown on the electrode heads by operation for the first time, that is to say that tungsten deposition and rearrangement processes are effected at the arc attachment region. The tip growth is dependent on the frequency of the lamp current, inter alia.

High-pressure mercury lamps for projection applications (P-VIP) are operated from electronic ballasts (EBs, PT-VIP lamp drivers) which output a temporally variable AC current to the lamp. The mean current ($I_{RMS}$) is controlled by the EB depending on the measured lamp voltage such that a preset electrical power (target value) is output to the lamp during operation. Depending on the operating mode, this power can be varied, for example by the projector or user.

The temporal form of the current profile (waveform) is dependent on a projector color wheel and/or the operating mode of the projector, for example, wherein the waveform consists of individual segments of different lengths, each of which assumes a specific momentarily constant lamp current intensity. Commutations can be inserted between the segments by the electronic ballast; that is to say that the direction of flow of the lamp current reverses its direction at these points. This results in different frequency components of the electric lamp operating current overall for each waveform.

The lamp voltage usually drifts during the lifetime of the lamp because the geometry and surface constitution and the thermal conditions associated therewith change at the electrode or the tip thereof. A burn-back or vaporization of the tips is typical; the consequence thereof is a decrease in luminous flux since the adaptation to the optical system, in particular to the reflector and to further light guiding elements of the projection apparatus, becomes less favorable as a result of the arc inevitably becoming longer. A further known phenomenon is the spontaneous melting of one of the electrode tips on account of a thermal overload resulting from radiation reflected back from the projector optical system, for example visible light reflected at a color wheel or else radiation components in the UV range.

Excessive tip growth is also possible as a result of unfavorable conditions, as a result of which the lamp assumes a very low running voltage. As a consequence thereof, this can result in the effect that the setpoint power can no longer be achieved on the basis of the dimensioning of the electronic ballast. The consequence thereof is an excessively low luminous flux.

Such great tip growth can be prevented for example by the electrode tips being melted in a targeted manner. In this context, WO 2010/086222 A1 discloses a method for operating a gas discharge lamp including a gas discharge lamp burner and a first and a second electrode, wherein the electrodes, before the first start-up thereof, have a nominal electrode spacing in the gas discharge lamp burner which is correlated with the lamp voltage, including the following steps: a) checking whether a blocking time corresponding to the time duration between two DC voltage phases has elapsed, b) if the blocking time has elapsed, applying DC voltage phases, or applying pseudo-commutations, for a predetermined time duration dependent on the lamp voltage, in such a way that a time duration for omitting commutations is predetermined for each lamp voltage.

Furthermore, asymmetrical waveforms can also be used. If the commutations are positioned in a waveform such that both very short and very long segment durations occur, then proportions of low and also high frequencies result for the lamp current in the frequency spectrum. In this context, DE 10 2011 089 592 A1 discloses a DLP projector for projecting at least one frame onto a projection surface. In this case, a discharge lamp is driven with a current waveform having a first and a second region, wherein a first frequency is assigned to the first region and a second frequency is assigned to the second region. The first frequency is calculated as $f_1=1/(2*T1)$, wherein T1 relates to the time period between the first and the second commutations. The second frequency is calculated as $$f_2 = n \bigg/ \bigg(2 * \sum_{i=1}^{n} T_i\bigg),$$

wherein $T_i$ relates to the time durations from one commutation to the next commutation within the region. Furthermore, a modulation factor relating to the ratio of second frequency to first frequency is at least 3.

WO 2009107019 A2 discloses an operating procedure which determines a target value for the voltage by measuring the voltage at defined points in time. In the event of the target value being exceeded or undershot, a switch-over of an operating parameter takes place (for example of the lamp frequency or a change of current pulse heights). However, this involves switching merely between two discrete operating modes which differ with regard to their frequency or their current pulse heights, for example. What is disadvantageous about this is that the frequency or the current pulse heights often cannot be chosen freely, but rather are coupled to boundary conditions which are predefined by the color wheel, for example.

SUMMARY

A projection apparatus includes a discharge lamp; a control apparatus for controlling a discharge current through the lamp. The apparatus is designed in a first drive mode, to control the discharge current having an amplitude profile; in a second drive mode, to control the discharge current in accordance with the amplitude profile; and to change between the first mode and the second mode. The time difference between two changes is given by a first time interval, and the time difference between the change from the first mode to the second mode and a next instance of leaving the second mode is given by a second time interval. The apparatus further includes a control device to determine a first manipulated variable depending on a control deviation determined by the difference between a target voltage value and a measured voltage value, and to determine the first and/or the second time interval therefrom.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 7 shows in simplified schematic illustration the lamp voltage as a function of the lamp power.

DESCRIPTION

Figure 1:
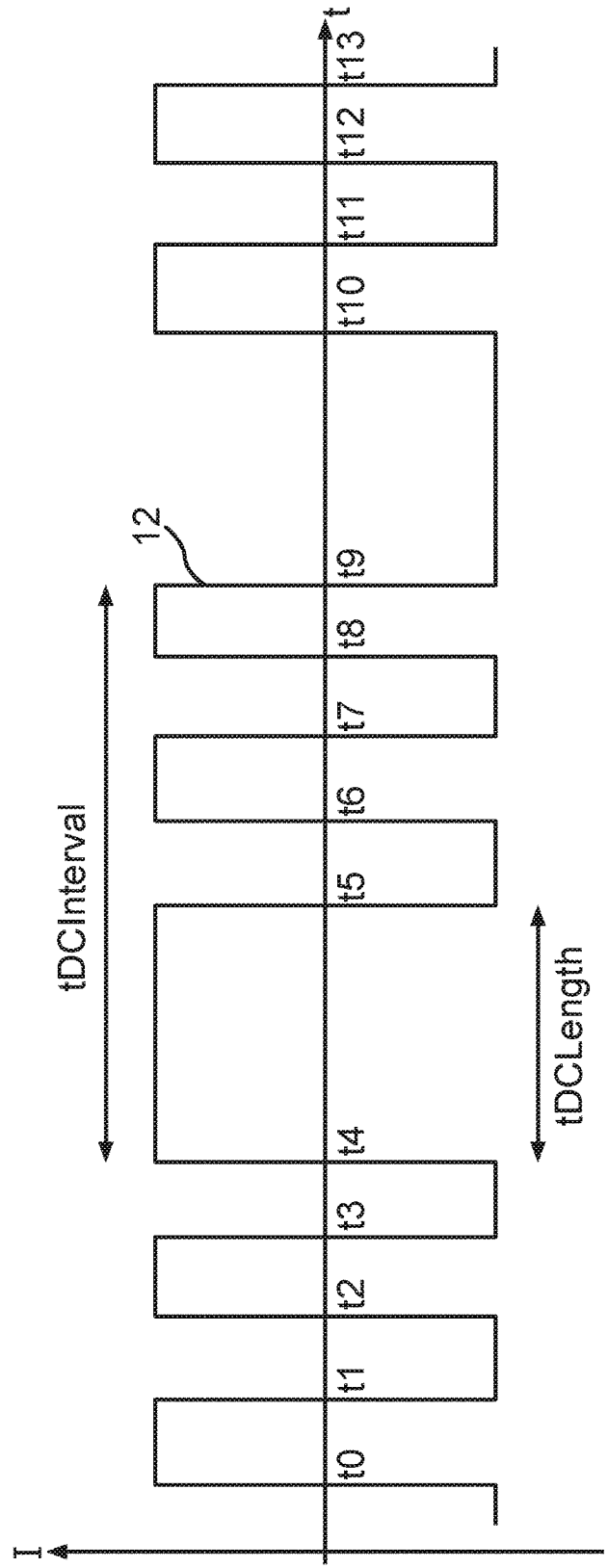
FIG. 1 shows in schematic illustration a greatly simplified embodiment of a current waveform.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The word "over" used with regards to a deposited material formed "over" a side or surface, may be used herein to mean that the deposited material may be formed "directly on", e.g. in direct contact with, the implied side or surface. The word "over" used with regards to a deposited material formed "over" a side or surface, may be used herein to mean that the deposited material may be formed "indirectly on" the implied side or surface with one or more additional layers being arranged between the implied side or surface and the deposited material.

Investigations by the inventors have shown here that very wide tips grow during operation with a lamp current having a frequency f=30 hertz, that tips having a moderate width and a long length grow at f=60 hertz, and that, moreover, thin, rather short tips grow during operation with a lamp current having a frequency f=300 hertz. In particular, it was possible to observe the effect that after a time of the order of magnitude of approximately 15 minutes, the growth rate appears to be partly reduced, which indicates a thermal decoupling of the tips.

Various embodiments provide a projection apparatus for projecting at least one frame onto a projection surface and a method for projecting at least one frame onto a projection surface which allows the spacing of the electrode tips to be controlled simply and in a manner applicable over a larger range of the lamp voltage.

Various embodiments are based on a projection apparatus for projecting at least one frame onto a projection surface, including at least one discharge lamp, a control apparatus for controlling a discharge current through the discharge lamp in such a way that the at least one frame is projected at a predefinable frame rate onto the projection surface. The control apparatus is designed, in a first drive mode, to control the discharge current in accordance with a predefinable basic current waveform having a predefinable amplitude profile in terms of absolute value and in each case a current commutation at predefinable points for reversing the polarity of the controlled discharge current, in a second drive mode, to control the discharge current in accordance with the predefinable amplitude profile in terms of absolute value and at the predefinable points without commutation or with directly successive double commutations, and to change between the first drive mode and the second drive mode in continuous succession. The time difference between two successive changes from the first drive mode to the second drive mode is given by a respective first time interval, and the time difference between the change from the first drive mode to the second drive mode and a next instance of leaving the second drive mode is given by a respective second time interval. The projection apparatus furthermore includes a measuring apparatus for continuously determining a measured voltage value correlated with a running voltage of the discharge lamp.

In this case, a basic current waveform is understood to mean a setpoint profile of the discharge current which was determined for example depending on customer-specific requirements with regard to absolute brightness or color rendering e.g. with optimization of the points of the current commutations at which the current flow direction through the discharge lamp is reversed, and is provided for operation in a respective projection mode.

According to various embodiments, the projection apparatus is developed by a control device designed to determine a first manipulated variable depending on a control deviation determined by the difference between a predefinable target voltage value and the measured voltage value, and to determine the first time interval and/or the second time interval therefrom.

Various embodiments are based on the insight that it is possible to achieve a control of the spacing of the electrode tips by a variation of the vaporization rate and/or growth rate depending on a spacing of the DC phases and/or directly successive double commutations (pseudo-commutations). In contrast to WO 2010/086 222 A1, the length of the first time interval, that is to say the spacing between two DC phases, is not directly dependent on the present measured voltage value in accordance with a unique assignment function, rather the presently optimum setting is determined individually by a control device. The interval of the DC phases is thus not predetermined by the present voltage.

Moreover, the time spacing of the DC phases is typically significantly shorter than the 90 seconds known from WO 2010/086 222 A1. At 10 seconds the vaporization region is already reached at a fundamental frequency of 300 hertz. In order to obtain growth at all, a length for the first time interval of an order of magnitude of less than 2 seconds should be chosen. Furthermore, the effect is afforded that the lamp voltage and/or the spacing of the electrode tips can be kept stable within predefinable limits over a longer period of time. The method is independent of the state of the lamp and the electrodes that is respectively present in detail, and adapts independently to the respective optimum of the operating parameters. In contrast to behavior with fixed characteristic curves, the temporal variation of the lamp voltage can also be reduced alongside the manufacturing tolerance.

The method operates independently of customer-specific waveforms (a set of a plurality of basic waveforms which were optimized for different projection modes with regard to absolute brightness or color rendering is usually used) which have to satisfy customer-specific requirements for example in association with a color wheel of a projection apparatus. Additional, time-consuming and costly checking and adaptation of the waveforms over and above the normal checking of the basic waveforms can advantageously be omitted here. External influences on the energy balance of the electrode tips, for example reflection of radiation back from the projector optical system, can likewise be reduced in their effect since, by means of the control method, the operating parameters, e.g. the DC phases, can be set near-instantaneously such that (renewed) tip growth is possible even under these conditions.

In specific regular, but variable, intervals, commutations can be omitted and/or be replaced by two very rapidly successive commutations, so-called pseudo-commutations. Such a pseudo-commutation consisting of two directly successive commutations thus does not affect the current direction of the subsequent section of the current waveform. In other words, the current direction which was present before the pseudo-commutation is thereby maintained. Such a pseudo-commutation may be necessary on account of technical boundary conditions of the control apparatus, for example of the electronic ballast.

This results in time segments in which the sign of the lamp current and/or the lamp voltage does not change, so-called DC phases. Depending on the duration of said DC phases, an increase in low-frequency current components results on average, for example 16.67 milliseconds corresponding to approximately 30 hertz. It is crucial for the DC phases to be long in comparison with the typical duration between two commutations of the fundamental frequency, for example at 300 hertz corresponding to approximately 1.66 milliseconds, in order that sufficient growth rates can be obtained during the DC phases.

During continuous operation with a fundamental frequency of 300 hertz, for example, the inventors, proceeding from electrode tips grown in the production process, were able to observe a slow vaporization of the tips during the lifetime, which resulted in an increase in the lamp voltage and thus also a decrease in luminous flux. Depending on the temporal spacing of the DC phases, that is to say the length of the first time interval, it was possible to reduce the vaporization or even to achieve growth of the electrode tips. A shorter temporal spacing between successive DC phases, that is to say a reduction of the first time interval, is tantamount to a long-term proportion of lower frequencies.

The actual behavior is furthermore dependent on the lamp design and the individual geometry of the electrode, the age of the lamp and the respective lamp current. These variables influence the temporal and spatial temperature profile of the electrode and the tip thereof. The optimum of the time intervals and of the DC duration, that is to say of the first time interval and of the second time interval, for achieving a stable tip shape and position and hence a stable lamp voltage is unknown, however, and can generally only be determined by time-consuming experiments.

According to the inventors' insight, an aggravating factor is that different current waveforms also require a different setting of the optimum frequency and/or of the duration and, what is more, individual manufacturing tolerances of the lamps possibly cannot be adequately taken into account. Moreover, the optimum parameters for DC duration and time spacing may also vary in the course of the lifetime of a lamp.

This problem can be solved by the EB used or the projection apparatus measuring the present lamp voltage with regular, larger time spacings, for example between 1 second and 60 seconds, and comparing it with the target voltage value to be complied with, that is to say that the present difference between the predefinable target voltage value and the measured voltage value is determined.

In various embodiments, leaving the second drive mode is effected by changing to the first drive mode. It may thus be provided that outside the second time interval the discharge current through the discharge lamp is controlled in accordance with the predefinable basic current waveform or is controlled in accordance with the inverted predefinable basic current waveform. The polarity of the discharge current relative to the basic current waveform arises in this case depending on the number of omitted and/or doubled commutations within the preceding DC phases.

Assuming a discharge current in a preceding first time interval outside the second time interval which is controlled virtually "in phase" with respect to the basic current waveform, upon an effective omission of an odd number of commutations within the second time interval of a succeeding section within the first time interval outside the second time interval in said section there arises precisely the inverted profile of the discharge current in comparison with the basic current waveform, that is to say virtually the "in-antiphase" profile.

Alternatively, an additional third drive mode with an additional commutation, not contained in the basic current waveform, may be provided, a change being effected to said third drive mode upon leaving the second drive mode and said third drive mode being ended again with the next regular commutation of the basic current waveform. The third drive mode thus serves as an intermediate state between leaving the second drive mode and entering the first drive mode and makes it possible to provide an additional commutation. This may be expedient at low frequencies of the basic current waveform in order to be able to set a finer gradatability of the effective length of a DC phase.

In various embodiments, the control device includes a PID controller for determining the first manipulated variable depending on the control deviation. In various embodiments, the control device includes at least one controller which may have e.g. a combination of different controller types.

In various embodiments, the projection apparatus includes a compensation apparatus connected downstream of the control device, said compensation apparatus being designed to lengthen or to shorten the first time interval and/or the second time interval by a commutation position in order to obtain a discharge current which is free of DC current when averaged over a time duration of ten successive first time intervals, e.g. over a time duration of eight successive first time intervals.

A principle of various embodiments consists in determining, by means of a control device, the first time interval and/or the second time interval for the targeted growth or vaporization of the electrode tips. While the basic current waveform is embodied in such a way that as stipulated on average it has no DC component, the section-by-section omission of commutations and/or replacement of single commutations by double commutations may give rise to a DC component which is not compensated for even over a relatively long time duration, such that a DC component flows via the discharge lamp as a result, said component being undesired on account of its asymmetrical influence on both of the electrodes of the discharge lamp. In order to eliminate this undesired side effect, the compensation apparatus is thus used to adapt the length of the first time interval and/or of the second time interval in such a way as to enable the DC phases to be distributed as uniformly as possible over the respective current direction.

In various embodiments, it may be provided that in successive first time intervals in the respective second time interval the discharge current flows in the opposite direction to the preceding DC phase. It may likewise be provided that a change of polarity is forced at least after three successive DC phases of the same polarity. This results from the insertion or suppression of a commutation, which, as explained above, can be realized by an adaptation of the first time interval and/or of the second time interval.

In various embodiments, the projection apparatus includes a color wheel rotating at constant rotational speed and having a plurality of color sectors distributed over the circumference. Possible positions of a commutation within the current waveform synchronized with the rotation of the color wheel are predefined by the transitions between the color sectors. The transitions between the color sectors are also referred to as spokes. Such color wheels are used in so-called DLP projection apparatuses (digital light processing), in which the frame to be projected is provided via a micromirror array. For this purpose, the frame to be projected is split into individual color channels and projected successively onto the projection surface. The color wheel allows in each case only the light provided for the corresponding color channel to pass to the projection surface. During the transition from one color sector to a neighboring color sector it is not possible to provide a uniform color distribution over the entire frame. For this reason, while the projection beam path passes through the spoke region, the micromirror array is usually driven such that the mixed light does not reach the projection surface. Since the commutation of the discharge current is associated with a momentary dip in the brightness of the discharge lamp, the positions of the commutation are expediently implemented at the points at which the micromirror array masks out the spokes anyway. A disturbing visible influence of the commutation on the projected frame is prevented in this way.

In various embodiments, the basic current waveform has a fundamental frequency which is at least 90 hertz and at most 400 hertz, e.g. at least 180 hertz and at most 360 hertz. In the case of a fundamental frequency in the range mentioned it has been found that the effect of the invention is manifested in a particularly pronounced manner and it is possible to influence the electrode tips in both directions, namely to achieve both vaporization and growth. In this case, the fundamental frequency is understood to mean as it were an average frequency which is measured over relatively long periods of time. This can be calculated for example by way of the following calculation specification:

fundamental frequency=number of commutations per frame*frame rate/2.

Consequently, a fundamental frequency of 300 hertz results for example given 10 commutations per frame at a frame rate of 60 hertz. The discharge current through the discharge lamp can be controlled in such a way that the temporally variable, still rectified current profile is converted by means of the control apparatus, e.g. an electronic ballast, by insertion of commutations, for example greater than or equal to 10 commutations, per projected frame at a typical frame rate of 50 to 70 hertz, into a lamp AC current having a fundamental frequency of greater than or equal to 250 to 350 hertz.

In various embodiments, it may be provided that the control device has a control transfer response which is formed for determining the first time interval depending on the control deviation by a first function part having a linear transfer response and by a second function part having a transfer function including at least proportionally an exponential function or a power function. In various embodiments, the first function part may include the PID controller mentioned above. Such a configuration having a transfer function including at least proportionally an exponential function or a power function is based on the insight that the time between two DC phases that is defined by the first time interval is to be varied in a wide range in order to achieve the desired effect, although the underlying measurement variable in the form of the difference between the predefinable target voltage value and the measured voltage value, that is to say the control deviation, has a much smaller variation range. A spreading of the manipulated variable provided by the control device thus improves the control response of the control device. The power function may have for example a quadratic term or a cubic term depending on the manipulated variable as input variable.

In various embodiments, the second time interval has a predefinable constant value. Alternatively, it may be provided that the second time interval is determined depending on the control deviation. In this case, it may additionally be provided that the first time interval has a predefinable constant value.

For the operation of the projection apparatus, the following three possible operating modes thus result, in principle:

a) first time interval controlled/second time interval constant, b) first time interval constant/second time interval controlled, c) first time interval controlled/second time interval controlled.

In this case, the length of the second time interval is respectively chosen such that it is always less than the length of the first time interval. In various embodiments, a second time interval length which is less than half the first time interval length may be chosen.

In various embodiments, the control device includes a parameter setting unit designed to determine a rate of change of the measured voltage value and, if the rate of change exceeds a predefinable first change threshold value, by means of a second manipulated variable, to scale the first time interval with a predefinable first factor and/or the second time interval with a predefinable second factor.

In various embodiments, the first factor is greater than 1, e.g. at least 2; the second factor is e.g. less than 1, e.g. at most 0.5. This affords the effect that excessively rapid progression of an electrode reconfiguration is braked by virtue of the fact that the intervention variables that are crucial for this reconfiguration in the form of the first time interval and/or the second time interval are altered to the effect that the influence on the electrode tip form is weakened by virtue of the fact that the DC phases can be present only with a shortened duration or with a lengthened temporal spacing with respect to one another.

In various embodiments, the parameter setting unit is designed, if the rate of change falls below a predefinable second change threshold value, to set the first factor and/or the second factor to 1. In various embodiments, the second change threshold value is less than the first change threshold value by a predefinable hysteresis value, wherein the values are related to a positive rate of change with an increasing lamp voltage. In the same way, the same values with an opposite sign can be employed in the negative direction with a decreasing lamp voltage. In this way, it is possible to obtain a hysteresis which counteracts instabilities owing to a permanent change between the two parameter settings. A stabler control response can thus be obtained overall.

Various embodiments proceed from a method for projecting at least one frame onto a projection surface by means of a discharge lamp, including controlling a discharge current through the discharge lamp in such a way that the at least one frame is projected at a predefinable frame rate onto the projection surface, in a first drive mode, controlling the discharge current in accordance with a predefinable basic current waveform having a predefinable amplitude profile in terms of absolute value and in each case a current commutation at predefinable points for reversing the polarity of the controlled discharge current, and in a second drive mode, controlling the discharge current in accordance with the predefinable amplitude profile in terms of absolute value and at the predefinable points without commutation or with directly successive double commutations. The method furthermore includes changing between the first drive mode and the second drive mode in continuous succession, wherein the time difference between two successive changes from the first drive mode to the second drive mode is given by a respective first time interval, and the time difference between the change from the first drive mode to the second drive mode and a next instance of leaving the second drive mode is given by a respective second time interval, and continuously determining a measured voltage value correlated with a running voltage of the discharge lamp.

According to various embodiments, the method is developed by, depending on a control deviation determined by the difference between a predefinable target voltage value and the measured voltage value, determining a first manipulated variable, and determining the first time interval and/or the second time interval therefrom.

The method may be developed by determining the predefinable target voltage value depending on a set target power of the discharge lamp. As a result, even a discharge lamp which is not operated with its full power can be influenced in the shaping of the electrode tips with the aid of various embodiments.

The effects and features and also embodiments described for the projection apparatus according to the invention apply equally to corresponding methods, and vice versa. Consequently, corresponding method features can be provided for apparatus features, and vice versa.

In order to explain the invention, FIG. 1 illustrates a greatly simplified embodiment, e.g. without an amplitude modulation, of a current waveform 12. The absolute value of the current waveform 12 has a constant value here in the entire illustrated range of time t and changes sign in each case at the point of a commutation; a transition from a negative current to a positive current takes place at the points in time t0, t2, t4, t6, t8, t10 and t12, and a transition from the positive current to the negative current takes place at the points in time t1, t3, t5, t7, t9, t11 and t13.

In comparison with the intervals t0-t1, t1-t2, t2-t3, t3-t4, the interval t4-t5 is significantly lengthened and is referred to as time interval tDCLength. The respective length of the intervals t5-t6, t6-t7, t7-t8 and t8-t9 is similar to that of the intervals t0-t1 to t3-t4. The interval t9-t10 has a length comparable to that of the interval t4-t5, wherein in this DC phase the current here now flows in the opposite direction to before. The time difference between two successive DC phases (t4-t5/t9-t10) is given by a time interval tDCInterval, referred to as first time interval. The interval tDCLength is referred to as second time interval.

Figure 2:
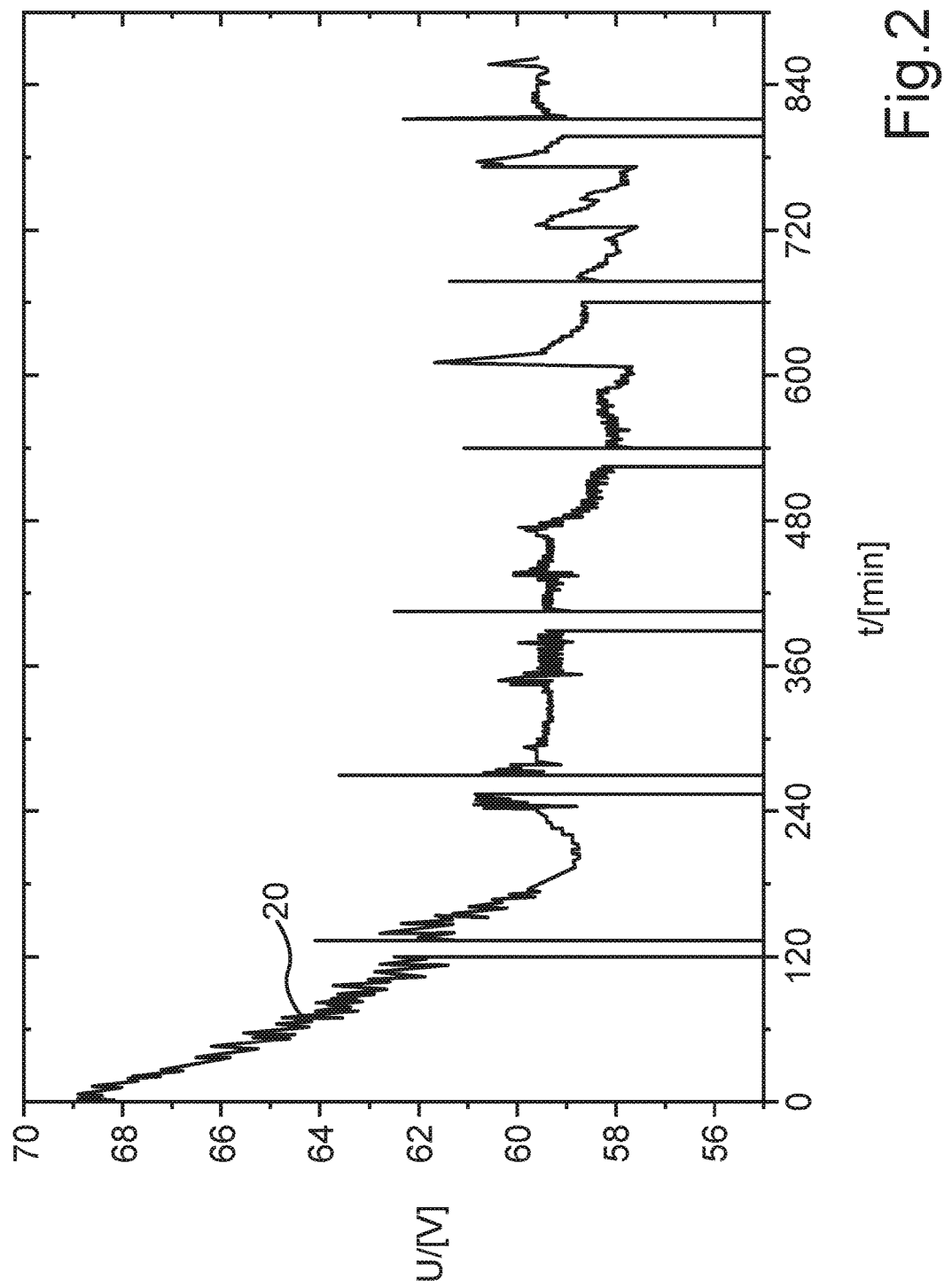
FIG. 2 shows in schematic illustration the voltage profile at a discharge lamp with constant DC phase settings in cyclic switching operation.

The diagram illustrated in FIG. 2 shows, plotted against time t in minutes, the profile of the lamp voltage U in volts as first voltage profile 20, wherein the first time interval tDCInterval was chosen as 32 milliseconds and the second time interval tDCLength was chosen as 16 milliseconds. The lamp was operated cyclically in a switching cycle with a switch-on time of two hours and a switch-off time of 15 minutes.

For the chosen setting of the first time interval tDCInterval with the magnitude of approximately 30 milliseconds (32 milliseconds), it was possible to observe great growth of the electrode tips, which can be verified in a clearly visible manner from the first voltage profile 20 in the range of time t between 0 and approximately 180 minutes. It is furthermore readily apparent that after the cyclic interruption for 15 minutes the voltage profile practically seamlessly follows the lamp voltage before the interruption.

In contrast thereto, in the case of approximately 8000 milliseconds (8 seconds) for the spacing between two successive DC phases, that is to say the first time interval tDCInterval, it is possible to observe slow vaporization of the electrode tips.

Figure 3:
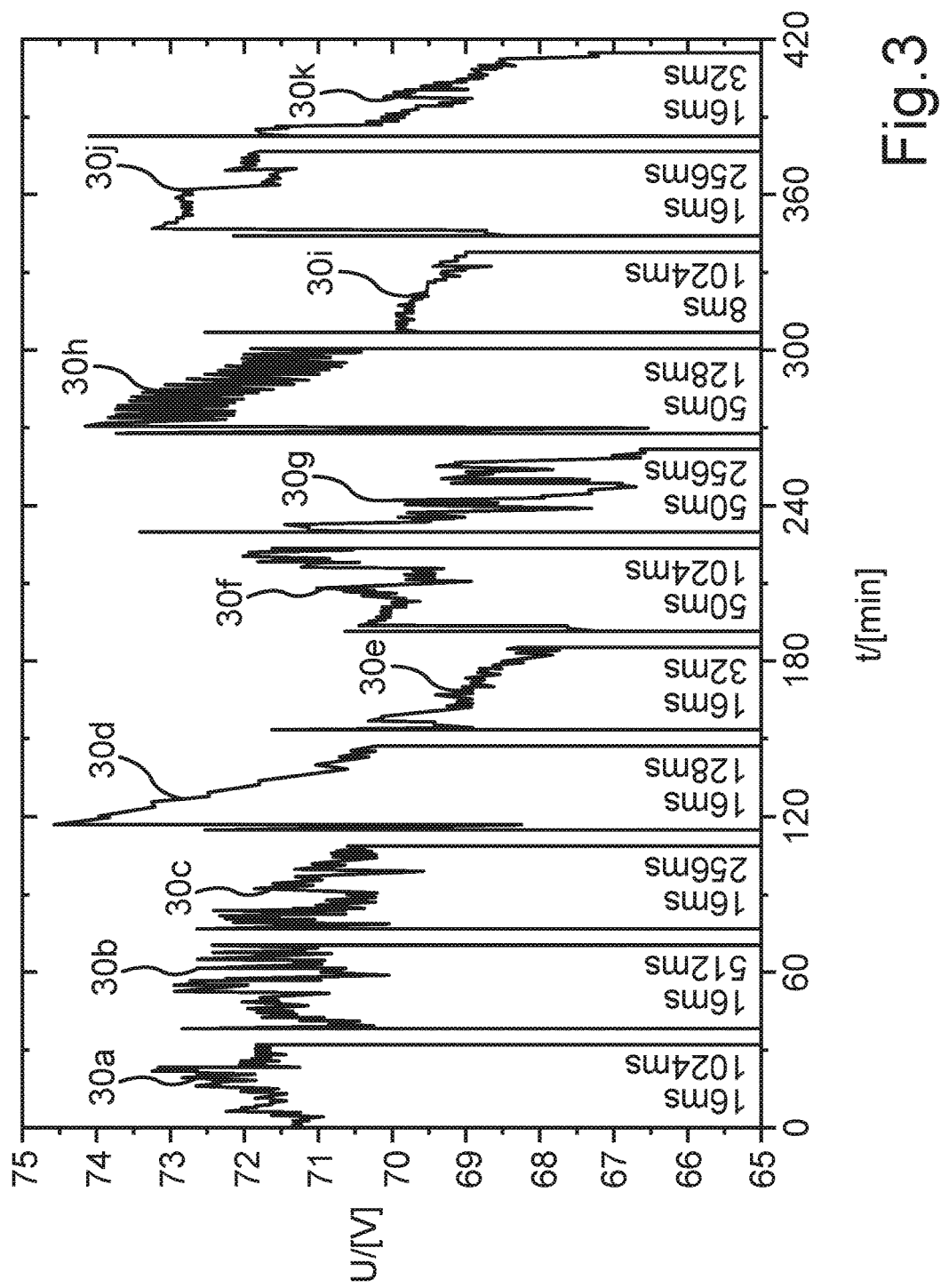
FIG. 3 shows in schematic illustration the voltage profile on the basis of a predefined current waveform having a high 60 hertz component with variation of the duration and the spacing of the DC phases with in each case a constant parameter set during a section of a switching cycle.

In this respect, FIG. 3 shows the voltage profile with a predefined waveform having a high 60 hertz component. The duration of the DC phases, that is to say the length of the second time interval tDCLength, and the spacing of the DC phases, that is to say the length of the first interval tDCInterval, are in each case varied here. The operating duration with the respective parameter setting is approximately 30 minutes, and the pauses are approximately 8 minutes in each case. The voltage profile is subdivided into the sections 30a, 30b, 30c, 30d, 30e, 30f, 30g, 30h, 30i, 30j, 30k. The parameter settings respectively present are compiled in the following table:

| Section | tDCLength | tDCInterval |
| --- | --- | --- |
| 30a | 16 Milliseconds | 1024 Milliseconds |
| 30b | 16 Milliseconds | 512 Milliseconds |
| 30c | 16 Milliseconds | 256 Milliseconds |
| 30d | 16 Milliseconds | 128 Milliseconds |
| 30e | 16 Milliseconds | 32 Milliseconds |
| 30f | 50 Milliseconds | 1024 Milliseconds |
| 30g | 50 Milliseconds | 256 Milliseconds |
| 30h | 50 Milliseconds | 128 Milliseconds |
| 30i | 8 Milliseconds | 1024 Milliseconds |
| 30j | 16 Milliseconds | 256 Milliseconds |
| 30k | 16 Milliseconds | 32 Milliseconds |

A vaporization of the electrode tips or a rearrangement of material at the electrode tip with a corresponding increase in the lamp voltage U can be discerned for example in sections 30a and 30f. Here the spacing between two DC phases, that is to say the length of the first time interval tDCInterval, is in each case 1024 milliseconds. Conversely, in the case of significantly shorter spacings of DC phases, such as, for example, 128 milliseconds for 30d and 30h or 32 milliseconds for 30e and 30k, a coalescence of the tips and thus a decrease in voltage are observed. Furthermore, it is evident that the temporal change in the lamp voltage is subjected to fluctuations despite unchanged operating parameters (time intervals tDCInterval and tDCLength). The cause may be, for example, different tip geometries in the respective situation. It is therefore advantageous to use, instead of a fixedly predefined parameter selection, a controller which determines an optimum parameter pair in each case for the present situation.

Figure 4:
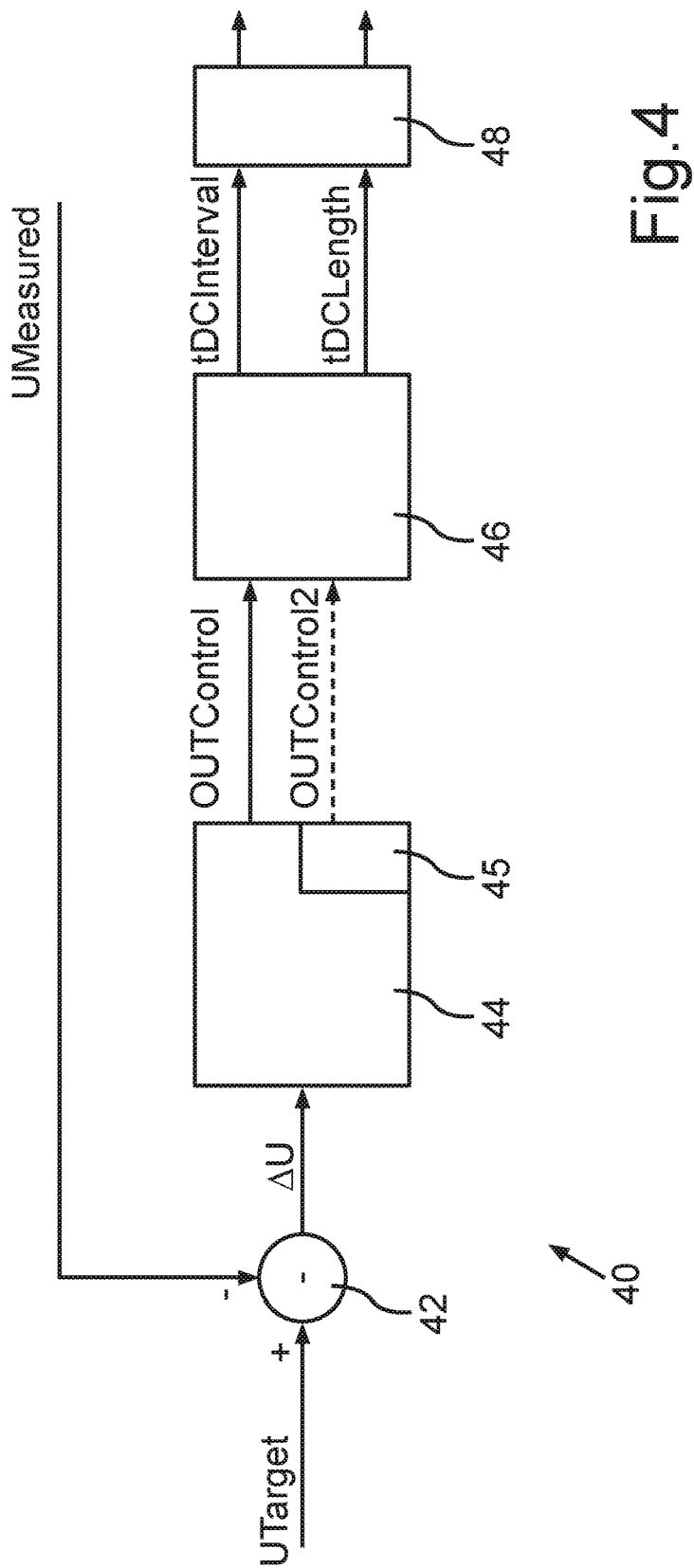
FIG. 4 shows in simplified schematic illustration an embodiment of a control device of a projection apparatus.

Various embodiments of a control device of a projection apparatus are illustrated in FIG. 4. The spacing and/or the duration of the DC phases are/is set by at least one controller 44 which may also include a combination of different controller types, preferably a PID controller which, besides the difference currently determined, may also take account of past values. A difference forming unit 42 is used to form the difference between a predefinable target voltage value UTarget and a measured voltage value UMeasured correlated with a running voltage of the discharge lamp, as a result of which a control deviation ΔU is determined and is fed to the controller 44. The controller 44 determines therefrom a first manipulated variable OUTControl; the latter is used by means of a nonlinear transfer element 46 for determining the first time interval tDCInterval and the second time interval tDCLength. A PID controller weights in each case the present deviation, the last measured deviation and the sum or the integral of the previous deviations by means of coefficients to be chosen in a suitable manner and determines the first manipulated variable OUTControl from the sum of the weighted values.

Over a relatively long operating duration (a few hours) it is thereby possible to attain or maintain the desired target voltage value UTarget of the lamp voltage U within predefinable limits. The coefficients for the PID controller can be determined or estimated according to the corresponding design rules and can be optimized by experiments with different lamp types. The aim here is that of attaining the predefined target voltage as rapidly as possible without overshoots.

A functional relationship between the controller manipulated variable OUTControl and the length of the first time interval tDCInterval, which relationship is provided by the nonlinear transfer element 46, can be represented as a formula for example as follows:

$$tDCInterval = tDCInterval0 * 2^{-OUTControl}.$$

A large time range of DC intervals and thus a sufficiently large range of growth and/or vaporization rates of the electrode tips can be covered by this exponential function. The parameter tDInterval0 is expediently chosen such that neither vaporization nor growth is observed in the case of a stable lamp voltage near the target value. In experimental trials, this range was between 250 milliseconds and 2000 milliseconds, typically usually greater than 500 milliseconds.

If the conditions at the electrode tips change in such a way that a comparatively rapid voltage rise in the range of greater than approximately 0.5 volt per minute occurs, which corresponds to collapse or severe melting of one or both electrode tips, then the above-described controllers would firstly react by shortening the first time interval tDCInterval in order once again to achieve growth of the tips and a reduction of the lamp voltage UL. Under certain circumstances the measure in this situation is unfavorable, however, since the more frequent DC phases bring about even greater fluctuations of the electrode tip temperature.

In order to counteract this effect, it may be provided, by means of a further controller, for example a two-point controller having hysteresis, upon the exceedance of a predefinable threshold of the voltage change, for example +0.5 volt per minute, that only the second time interval tDCLength is reduced or only the first time interval tDCInterval is increased, or the second time interval tDCLength and also the first time interval tDCInterval are reduced simultaneously. By way of example, both time intervals can be reduced to half of the value determined by a first controller of the control unit 44, wherein the first controller may be a PID controller, for example. It may likewise be provided that one of the two intervals is influenced only depending on the rate of change and not on the instantaneous value.

The two-point controller may be embodied as a parameter setting unit 45, for example, which provides a second manipulated variable OUTControl2 to the function part 46 in order to scale the first time interval tDCInterval and/or the second time interval tDCLength. If the voltage change over time subsequently falls below a predefinable second change threshold value, for example 0.25 volt per minute, then the original, unaltered time values for duration and interval are used again.

Furthermore, a compensation apparatus 48 connected downstream of the control device 40 can be provided, which determines a DC component of the discharge current depending on the basic current waveform and the first time interval tDCInterval and the second time interval tDCLength. Upon the occurrence of a DC component which is present when averaged over a relatively long period of time, for example a sequence of approximately eight to ten successive first time intervals tDCInterval, the compensation apparatus can lengthen or shorten the respective first time interval tDCInterval and/or the second time interval tDCLength by one commutation position, as a result of which an additional commutation becomes effective or an effective commutation is deactivated, both of which lead to the same effect that an inversion of the current waveform occurs at the point of the additional commutation or of the omitted commutation, as a result of which the DC content of the current waveform can be controlled on average.

Figure 5:
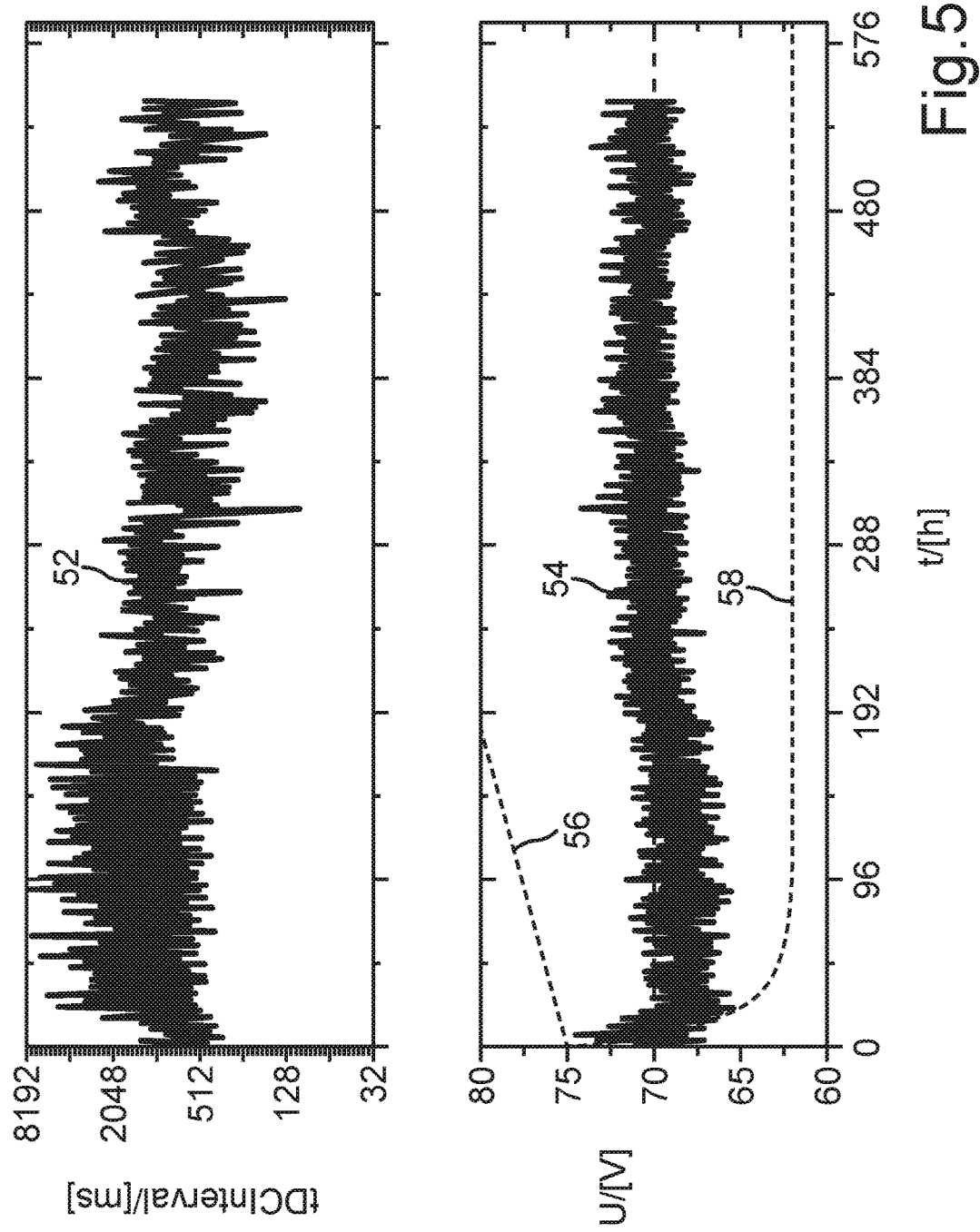
FIG. 5 shows in schematic illustration the voltage profile and the spacing of the DC phases that is predefined by means of a PID controller, plotted against time.

The profile of a value for the first time interval tDCInterval is illustrated as first curve line 52 in FIG. 5, wherein time t in hours is plotted on the abscissa and the value for the first time interval tDCInterval in milliseconds is plotted on the ordinate. In the lower part of the diagram in the same way the lamp voltage U in volts is plotted on the ordinate, and the profile of the lamp voltage U is illustrated as second curve profile 54. The value of the second time interval tDCLength, that is to say the length of the DC phases, here is in each case 8 milliseconds. In comparison therewith, the illustration respectively shows a third curve profile 56 having a constant first time interval tDCInterval, namely 10 seconds, and a fourth curve profile 58 having a constant time interval tDCInterval with a magnitude of 0.5 second, wherein the third curve profile 56 and the fourth curve profile 58 represent a typical average voltage profile and are illustrated in a dashed manner in FIG. 5. The lamp was operated cyclically with a switched-on duration of 2 hours and a switched-off duration of 15 minutes; the power of the lamp was 240 watts. It is readily discernible, particularly in the range of time t between 0 and 192 hours, that the value of the first time interval tDCInterval first of all rises to counteract a further decrease in the voltage and to control the latter to a target voltage of 70 volts. Both values then subsequently stabilize at the target voltage of 70 volts in a range starting from approximately 240 hours.

In a further example of control by means of a PID controller, the profile of the lamp voltage U and the spacing of the DC phases in the form of the first time interval tDCInterval given a constant value for the second time interval tDCLength, that is to say the length of the respective DC phase, with a magnitude of 8 milliseconds were determined over time for three lamps selected by way of example. As already previously, the lamps were operated in a switching cycle with in each case a switched-on duration of 2 hours and a switched-off duration of 15 minutes and were controlled to a target voltage of 70 volts. All three lamps in each case have a power of 190 watts.

Figure 6:
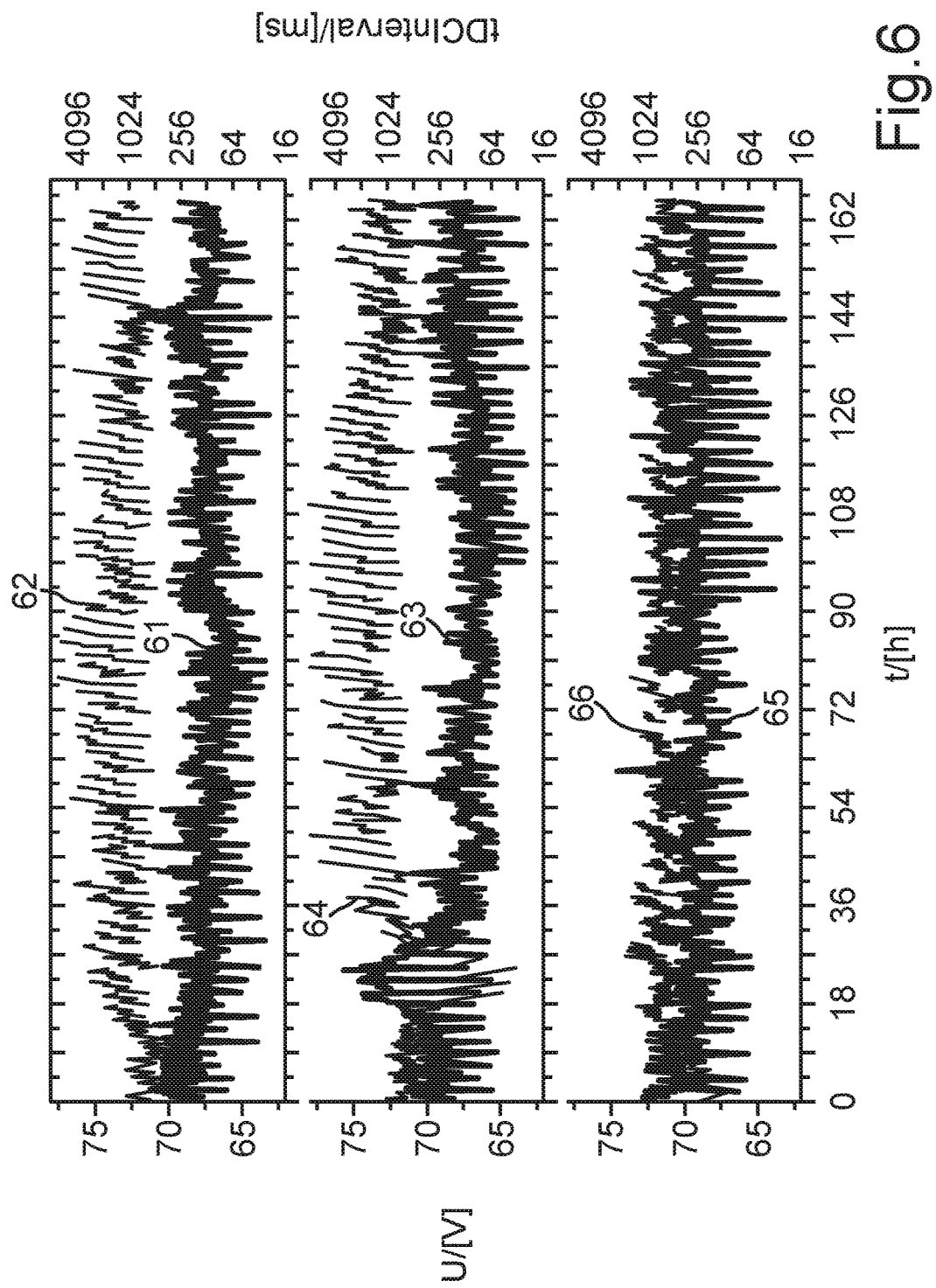
FIG. 6 shows in schematic illustration the voltage profile and spacing of the DC phases plotted against time for three specimens of a 190 watt lamp.

The diagram in FIG. 6 shows a first voltage curve profile 61 for the first lamp, a second voltage curve profile 63 for the second lamp and a third voltage curve profile 65 for the third lamp. In the same way, a first DC phase spacing profile 62 for the first lamp, a second DC phase spacing profile 64 for the second lamp and a third DC phase spacing profile 66 for the third lamp are illustrated, which respectively represent the profile of the value for the first time interval tDCInterval. The opposite correlation of the first time interval tDCInterval and the lamp voltage U is readily discernible in the respective curve pairs of a lamp, which is visible particularly clearly in the case of the curve pair 63/64 in the time range between 18 and 24 hours and in the case of the curve pair 65/66 in the time range between 63 hours and 81 hours.

For example the comparison of the first two lamps with the third lamp shows that with a similar average value for the lamp voltage U of the order of magnitude of approximately 70 volts the value for the first time interval tDCInterval deviates significantly. This shows that the various embodiments are well suited also to controlling variations of the lamp parameters.

During stable lamp operation, the lamp voltage U is also dependent on the operating current and/or the target power besides the lamp geometry and the mercury density in the discharge space. The target power is often also specified as a percentage relative to the lamp nominal power as "gain". If the lamp power is varied, then for the dependence of the lamp voltage a typical characteristic curve is obtained which assumes lower values in the case of a small gain compared with operation at nominal power (100 percent). A relationship is illustrated in FIG. 7. Here the lamp voltage U is plotted as a function of the lamp gain indicating the power in percent. On the abscissa, the gain of the lamp in percent is plotted in steps of ten in the range between 30 and 100; on the ordinate, the lamp voltage U in volts is plotted in steps of five between 25 and 80.

Measured values 72a, 72b, 72c, 72d, 72e, 72f, 72g, 72h, 72i are respectively plotted for different values of the respective lamp power, that is to say of the gain. For example, the measured values 72g show the lamp voltage U by way of example in the case of a lamp gain of approximately 85 percent. A fitted curve 74 representing the basic profile of the individual measurement points which have this variation bandwidth is additionally plotted.

In the case of a lamp power with a gain of greater than or equal to 80 percent, the voltage U is approximately 75 volts in an approximately constant manner. In other words, in this range the lamp voltage U is determined only by the electrode spacing. Below a gain of approximately 70 percent, a practically linear decrease in the lamp voltage U with the gain can be observed. This decreasing lamp voltage U with decreasing power of the lamp is caused by the increasing condensation of the mercury in the lamp vessel and thus a decrease in the mercury vapor pressure. The profile can be approximated in principle by two straight line segments which simulate the linear rise in the lamp voltage U and the constant range.

On the basis of a characteristic of this type such as is represented by the curve profile 74 depending on a reduced lamp power, that is to say depending on the gain, it is possible to predefine a correspondingly adapted target voltage value UTarget for the control. In this way various embodiments function even with dimmed power.

Within the voltage control described here that can be taken into account by adapting the respectively valid value of the target voltage value UTarget to the respectively required lamp power on the basis of a characteristic curve which is stored in the electronic ballast or is realized in terms of circuitry. Alternatively or additionally, it is possible to modify the functional relationship between the controller manipulated variable and the duration or the interval of the DC phases depending on the required lamp power.

Depending on the operating mode of the lamp it may also be expedient to deactivate the control. For example, in so-called "dynamic dimming" with fast variation of the lamp power on account of the characteristic curve relationship it is not possible to achieve a temporally stable lamp voltage U. Even in the case of a very small lamp power, for example at approximately 30 percent of the nominal power, frequent or excessively long DC phases can lead to sudden heating of the electrode tips and thus to the collapse thereof.

Various embodiments serve only for explaining the invention, but are not restrictive for the invention. For example, the concrete configuration of the control unit 44 and the implementation in the nonlinear function part 46 may be fashioned in any desired manner, without departing from the concept of the invention.

It has thus been shown above how it is possible to fashion a method and an electronic ballast for stabilizing the lamp voltage of an extra-high-pressure discharge lamp through use in a projection apparatus.

The features and feature combinations mentioned above in the description and also the features and feature combinations mentioned in the description of the figures and/or shown solely in the figures can be used not only in the combination respectively indicated, but also in other combinations or by themselves, without departing from the scope of the invention. Consequently, the invention should be considered also to encompass and disclose embodiments which are not explicitly shown or explained in the figures but emerge and are producible by means of separate feature combinations from the explained embodiments.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A projection apparatus for projecting at least one frame onto a projection surface, the projection apparatus comprising:
   at least one discharge lamp;
   a control apparatus for controlling a discharge current through the discharge lamp in such a way that the at least one frame is projected at a predefinable frame rate onto the projection surface, wherein the control apparatus is designed
      in a first drive mode, to control the discharge current in accordance with a predefinable basic current waveform having a predefinable amplitude profile in terms of absolute value and in each case a current commutation at predefinable points for reversing the polarity of the controlled discharge current;
      in a second drive mode, to control the discharge current in accordance with the predefinable amplitude profile in terms of absolute value and at the predefinable points without commutations or with directly successive double commutations; and
      to change between the first drive mode and the second drive mode in continuous succession, wherein the time difference between two successive changes from the first drive mode to the second drive mode is given by a respective first time interval, and the time difference between the change from the first drive mode to the second drive mode and a next instance of leaving the second drive mode is given by a respective second time interval; and
   a measuring apparatus for continuously determining a measured voltage value correlated with a running voltage of the discharge lamp; and
   a control device designed to determine a first manipulated variable depending on a control deviation determined by the difference between a predefinable target voltage value and the measured voltage value, and to determine at least one of the first time interval or the second time interval therefrom.

2. The projection apparatus of claim 1,
   wherein leaving the second drive mode is effected by changing to the first drive mode.

3. The projection apparatus of claim 1,
   wherein the control device comprises a PID controller for determining the first manipulated variable depending on the control deviation.

4. The projection apparatus of claim 1, further comprising:
   a compensation apparatus connected downstream of the control device, said compensation apparatus being designed to lengthen or to shorten at least one of the first time interval or the second time interval by a commutation position in order to obtain a discharge current which is free of DC current when averaged over a time duration of 10 successive first time intervals.

5. The projection apparatus of claim 1,
   wherein the projection apparatus comprises a color wheel rotating at constant rotational speed and having a plurality of color sectors distributed over the circumference;
   wherein possible positions of a commutation within the current waveform synchronized with the rotation of the color wheel are predefined by the transitions between the color sectors.

6. The projection apparatus of claim 1,
   wherein the basic current waveform has a fundamental frequency which is at least 90 Hz and at most 400 Hz.

7. The projection apparatus of claim 6,
   wherein the basic current waveform has a fundamental frequency which is at least 180 Hz and at most 360 Hz.

8. The projection apparatus of claim 1,
   wherein the control device has a control transfer response which is formed for determining the first time interval depending on the control deviation by a first function part having a linear transfer response and by a second function part having a transfer function comprising at least proportionally an exponential function or a power function.

9. The projection apparatus of claim 1,
   wherein the second time interval has a predefinable constant value.

10. The projection apparatus of claim 1,
    wherein the control device comprises a parameter setting unit designed to determine a rate of change of the measured voltage value and, if the rate of change exceeds a predefinable first change threshold value, by means of a second manipulated variable, to scale at least one of the first time interval with a predefinable first factor or the second time interval with a predefinable second factor.

11. The projection apparatus of claim 10,
    wherein the parameter setting unit is designed, if the rate of change falls below a predefinable second change threshold value, to set at least one of the first factor or the second factor to one.

12. The projection apparatus of claim 1, further comprising:
    a compensation apparatus connected downstream of the control device, said compensation apparatus being designed to lengthen or to shorten at least one of the first time interval or the second time interval by a commutation position in order to obtain a discharge current which is free of DC current when averaged over a time duration of 8 successive first time intervals.

13. A method for projecting at least one frame onto a projection surface by a discharge lamp, the method comprising:
    controlling a discharge current through the discharge lamp in such a way that the at least one frame is projected at a predefinable frame rate onto the projection surface;
    in a first drive mode, controlling the discharge current in accordance with a predefinable basic current waveform having a predefinable amplitude profile in terms of absolute value and in each case a current commutation at predefinable points for reversing the polarity of the controlled discharge current;
    in a second drive mode, controlling the discharge current in accordance with the predefinable amplitude profile in terms of absolute value and at the predefinable points without commutations or with directly successive double commutations; and
    changing between the first drive mode and the second drive mode in continuous succession, wherein the time difference between two successive changes from the first drive mode to the second drive mode is given by a respective first time interval, and the time difference between the change from the first drive mode to the second drive mode and a next instance of leaving the second drive mode is given by a respective second time interval;
    continuously determining a measured voltage value correlated with a running voltage of the discharge lamp; and depending on a control deviation determined by the difference between a predefinable target voltage value and the measured voltage value, determining a first manipulated variable, and determining at least one of the first time interval or the second time interval therefrom.

14. The method of claim 13,
determining the predefinable target voltage value depending on a set target power of the discharge lamp.

* * * * *